(12) United States Patent
Bunker et al.

(10) Patent No.: US 10,053,987 B2
(45) Date of Patent: Aug. 21, 2018

(54) COMPONENTS WITH COOLING CHANNELS AND METHODS OF MANUFACTURE

(71) Applicant: General Electric Company, Schenectady, NY (US)

(72) Inventors: Ronald Scott Bunker, West Chester, OH (US); Scott Andrew Weaver, Ballston Lake, NY (US); Don Mark Lipkin, Niskayuna, NY (US); John Brian McDermott, Rexford, NY (US)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 14/929,273

(22) Filed: Oct. 31, 2015

(65) Prior Publication Data

US 2016/0053618 A1 Feb. 25, 2016

Related U.S. Application Data

(62) Division of application No. 13/595,120, filed on Aug. 27, 2012, now Pat. No. 9,249,672.

(51) Int. Cl.
*F01D 25/12* (2006.01)
*F01D 5/18* (2006.01)
(Continued)

(52) U.S. Cl.
CPC .............. *F01D 5/187* (2013.01); *B23P 15/04* (2013.01); *F01D 5/225* (2013.01); *F01D 5/288* (2013.01);
(Continued)

(58) Field of Classification Search
None
See application file for complete search history.

(56) References Cited

U.S. PATENT DOCUMENTS 3,516,895 A * 6/1970 Hartman ................ B21D 47/00
 244/117 R
3,672,787 A * 6/1972 Jones ...................... F01D 5/184
 416/231 R
(Continued)

FOREIGN PATENT DOCUMENTS

EP 1387040 B1 4/2004
WO WO 9735678 A2 * 10/1997 ........... B22D 23/003

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.
(Continued)

*Primary Examiner* — Jeffrey A Vonch
(74) *Attorney, Agent, or Firm* — GE Global Patent Operation; John P. Darling

(57) ABSTRACT

A manufacturing method includes forming one or more grooves in a component that comprises a substrate with an outer surface. The substrate has at least one interior space. Each groove extends at least partially along the substrate and has a base and a top. The manufacturing method further includes applying a structural coating on at least a portion of the substrate and processing at least a portion of the surface of the structural coating so as to plastically deform the structural coating at least in the vicinity of the top of a respective groove, such that a gap across the top of the groove is reduced. A component is also disclosed and includes a structural coating disposed on at least a portion of a substrate, where the surface of the structural coating is faceted in the vicinity of the respective groove.

6 Claims, 6 Drawing Sheets

(51) Int. Cl.
  *B23P 15/04* (2006.01)
  *F01D 5/22* (2006.01)
  *F01D 5/28* (2006.01)
  *F01D 9/04* (2006.01)
  *F01D 25/28* (2006.01)
  *F01D 25/30* (2006.01)

(52) U.S. Cl.
  CPC ............ *F01D 9/041* (2013.01); *F01D 25/12* (2013.01); *F01D 25/28* (2013.01); *F01D 25/30* (2013.01); *B23P 2700/13* (2013.01); *F01D 5/182* (2013.01); *F01D 5/186* (2013.01); *F05D 2220/32* (2013.01); *F05D 2230/90* (2013.01); *F05D 2260/202* (2013.01); *F05D 2260/203* (2013.01); *F05D 2260/204* (2013.01); *F05D 2300/611* (2013.01); *Y10T 29/4932* (2015.01); *Y10T 29/49341* (2015.01); *Y10T 29/49982* (2015.01); *Y10T 428/13* (2015.01); *Y10T 428/24314* (2015.01); *Y10T 428/24322* (2015.01); *Y10T 428/24521* (2015.01); *Y10T 428/24562* (2015.01); *Y10T 428/24612* (2015.01); *Y10T 428/24636* (2015.01)

(56) References Cited

U.S. PATENT DOCUMENTS

| | | | |
|---|---|---|---|
| 4,487,550 A | | 12/1984 | Horvath et al. |
| 4,893,987 A | | 1/1990 | Lee et al. |
| 5,130,163 A | * | 7/1992 | Clingman ................ C23C 4/02 427/226 |
| 5,419,039 A | * | 5/1995 | Auxier ................... B23P 15/04 29/889.7 |
| 5,476,363 A | | 12/1995 | Freling et al. |
| 5,564,902 A | | 10/1996 | Tomita |
| 5,626,462 A | | 5/1997 | Jackson et al. |
| 5,640,767 A | | 6/1997 | Jackson et al. |
| 5,660,523 A | | 8/1997 | Lee |
| 5,771,577 A | | 6/1998 | Gupta et al. |
| 5,875,549 A | | 3/1999 | McKinley |
| 5,941,686 A | * | 8/1999 | Gupta ..................... F01D 5/186 415/115 |
| 6,059,530 A | | 5/2000 | Lee |
| 6,086,328 A | | 7/2000 | Lee |
| 6,164,914 A | | 12/2000 | Correia et al. |
| 6,190,129 B1 | | 2/2001 | Mayer et al. |
| 6,214,248 B1 | | 4/2001 | Browning et al. |
| 6,231,307 B1 | | 5/2001 | Correia |
| 6,234,755 B1 | | 5/2001 | Bunker et al. |
| 6,321,449 B2 | | 11/2001 | Zhao et al. |
| 6,368,060 B1 | * | 4/2002 | Fehrenbach ............ F01D 5/186 416/97 A |
| 6,383,602 B1 | | 5/2002 | Fric et al. |
| 6,405,435 B1 | | 6/2002 | Konter et al. |
| 6,412,541 B2 | | 7/2002 | Roesler et al. |
| 6,427,327 B1 | | 8/2002 | Bunker |
| 6,461,107 B1 | | 10/2002 | Lee et al. |
| 6,461,108 B1 | | 10/2002 | Lee et al. |
| 6,494,678 B1 | | 12/2002 | Bunker |
| 6,551,061 B2 | | 4/2003 | Darolia et al. |
| 6,582,194 B1 | | 6/2003 | Birkner et al. |
| 6,602,052 B2 | | 8/2003 | Liang |
| 6,602,053 B2 | | 8/2003 | Subramanian et al. |
| 6,617,003 B1 | | 9/2003 | Lee et al. |
| 6,634,860 B2 | | 10/2003 | Lee et al. |
| 6,749,396 B2 | * | 6/2004 | Barry ..................... F01D 5/186 415/115 |
| 6,905,302 B2 | | 6/2005 | Lee et al. |
| 6,921,014 B2 | | 7/2005 | Hasz et al. |
| 6,994,514 B2 | | 2/2006 | Soechting et al. |
| 7,014,923 B2 | | 3/2006 | Schnell et al. |
| 7,094,475 B2 | | 8/2006 | Schnell et al. |
| 7,186,167 B2 | | 3/2007 | Joslin |
| 7,216,428 B2 | | 5/2007 | Memmen et al. |
| 7,302,990 B2 | | 12/2007 | Bunker et al. |
| 7,334,991 B2 | | 2/2008 | Liang |
| 7,553,534 B2 | * | 6/2009 | Bunker ................... F01D 5/186 415/115 |
| 7,625,180 B1 | * | 12/2009 | Liang ...................... F01D 5/186 29/889.2 |
| 7,703,312 B2 | | 4/2010 | David |
| 7,704,049 B1 | * | 4/2010 | Liang ...................... F01D 5/183 416/224 |
| 7,744,348 B2 | | 6/2010 | Bezencon et al. |
| 7,766,617 B1 | | 8/2010 | Liang |
| 7,775,768 B2 | | 8/2010 | Devore et al. |
| 7,946,335 B2 | | 5/2011 | Bewlay et al. |
| 7,967,924 B2 | | 6/2011 | Groh et al. |
| 8,147,196 B2 | | 4/2012 | Campbell et al. |
| 8,210,815 B2 | | 7/2012 | Bezencon et al. |
| 8,292,587 B2 | | 10/2012 | Poon et al. |
| 8,387,245 B2 | | 3/2013 | Bunker et al. |
| 8,528,208 B2 | | 9/2013 | Rebak et al. |
| 8,533,949 B2 | | 9/2013 | Bunker et al. |
| 8,535,491 B2 | | 9/2013 | Wei et al. |
| 8,601,691 B2 | | 12/2013 | Rebak et al. |
| 8,651,805 B2 | | 2/2014 | Lacy et al. |
| 8,673,397 B2 | | 3/2014 | Bunker et al. |
| 8,727,727 B2 | | 5/2014 | Bunker et al. |
| 8,739,404 B2 | | 6/2014 | Bunker et al. |
| 8,752,289 B2 | | 6/2014 | Jones |
| 8,753,071 B2 | | 6/2014 | Bunker |
| 8,857,055 B2 | | 10/2014 | Wei et al. |
| 8,905,713 B2 | | 12/2014 | Lacy et al. |
| 8,974,859 B2 | * | 3/2015 | Bunker ................... F01D 5/187 427/282 |
| 9,216,491 B2 | * | 12/2015 | Bunker ................... B24C 1/045 |
| 9,249,491 B2 | * | 2/2016 | Bunker ................... B23P 15/04 |
| 9,249,670 B2 | * | 2/2016 | Bunker ................... F01D 5/186 |
| 9,249,672 B2 | * | 2/2016 | Bunker ................... F01D 5/147 |
| 2001/0001897 A1 | * | 5/2001 | Zhao ..................... B23P 15/04 29/889 |
| 2002/0141872 A1 | * | 10/2002 | Darolia ................... F01D 5/182 416/241 R |
| 2004/0134897 A1 | * | 7/2004 | Das ..................... B23K 26/0622 219/121.71 |
| 2006/0222492 A1 | * | 10/2006 | Gross ..................... F01D 5/187 416/97 R |
| 2007/0181278 A1 | | 8/2007 | Bancher et al. |
| 2008/0057271 A1 | * | 3/2008 | Bunker ................... F01D 5/186 428/137 |
| 2008/0298975 A1 | * | 12/2008 | James ..................... B23P 15/04 416/229 A |
| 2009/0235525 A1 | * | 9/2009 | Arrell ..................... B21D 53/78 29/889.2 |
| 2010/0028131 A1 | * | 2/2010 | Arrell ..................... F01D 5/3061 415/115 |
| 2010/0075111 A1 | * | 3/2010 | Arrell ..................... B23P 15/00 428/172 |
| 2010/0129231 A1 | * | 5/2010 | Brittingham ............ F01D 5/186 416/97 R |
| 2011/0097188 A1 | * | 4/2011 | Bunker ................... F01D 5/186 415/1 |
| 2011/0097538 A1 | * | 4/2011 | Bolcavage ............ F01D 5/288 428/137 |
| 2011/0192024 A1 | * | 8/2011 | Allen ..................... B23P 15/04 29/889.721 |
| 2011/0259017 A1 | * | 10/2011 | Lacy ...................... F01D 5/186 60/806 |
| 2012/0111545 A1 | * | 5/2012 | Bunker ................... B23P 15/04 165/133 |
| 2012/0114868 A1 | | 5/2012 | Bunker et al. |
| 2012/0114912 A1 | * | 5/2012 | Bunker ................... C23C 4/02 428/173 |
| 2012/0124832 A1 | * | 5/2012 | Bunker ................... F01D 5/147 29/888 |
| 2012/0145371 A1 | * | 6/2012 | Bunker ................... F01D 5/147 165/177 |
| 2012/0148769 A1 | | 6/2012 | Bunker et al. |

(56) References Cited

U.S. PATENT DOCUMENTS

| | | | |
|---|---|---|---|
| 2012/0243995 A1 | 9/2012 | Bunker et al. | |
| 2012/0328448 A1 | 12/2012 | Bunker | |
| 2013/0043009 A1 | 2/2013 | Bunker et al. | |
| 2013/0056184 A1 | 3/2013 | Bunker et al. | |
| 2013/0078418 A1 | 3/2013 | Bunker et al. | |
| 2013/0078428 A1 | 3/2013 | Bunker et al. | |
| 2013/0086784 A1 | 4/2013 | Bunker | |
| 2013/0101761 A1 | 4/2013 | Bunker et al. | |
| 2013/0156600 A1 | 6/2013 | Bunker | |
| 2013/0183165 A1* | 7/2013 | Lacy | F01D 5/186 416/97 R |
| 2013/0183166 A1* | 7/2013 | Lacy | F01D 5/186 416/97 R |
| 2013/0272850 A1 | 10/2013 | Bunker | |
| 2013/0312941 A1 | 11/2013 | Bunker | |
| 2013/0316100 A1* | 11/2013 | Bunker | F01D 5/147 428/34.1 |
| 2014/0116660 A1 | 5/2014 | Bunker et al. | |
| 2016/0010464 A1* | 1/2016 | Bunker | F01D 5/187 415/115 |

OTHER PUBLICATIONS

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.
Bonini et al., "Methods of Forming Cooling Channels Using Backstrike Protection", U.S. Appl. No. 13/628,204, filed Sep. 27, 2012.

\* cited by examiner

COMPONENTS WITH COOLING CHANNELS AND METHODS OF MANUFACTURE

BACKGROUND

The disclosure relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. For certain applications, it is desirable to form channels with narrow openings (relative to the hydraulic diameter of the channel) so that the coating will more easily bridge the channel. For example, it has recently been proposed to machine micro-channels using an abrasive liquid jet. However, it may be challenging to form a sufficiently narrow channel top (restricted opening) in some instances because when the size of the liquid jet nozzle orifice is below about 10 mils (0.254 mm), the abrasive particles may clog the nozzle, possibly leading to loss of dimensional tolerances, machining flaws, or loss of machine operability.

It would therefore be desirable to form channels with reduced openings (relative to the hydraulic diameter of the channel) to facilitate the application of bridging coatings across the channel openings.

BRIEF DESCRIPTION

One aspect of the present disclosure resides in a manufacturing method that includes forming one or more grooves in a component that includes a substrate with an outer surface. The substrate has at least one interior space. Each groove extends at least partially along the substrate and has a base and a top. The manufacturing method further includes applying a structural coating on at least a portion of the substrate and processing at least a portion of the surface of the structural coating so as to plastically deform the structural coating in the vicinity of the top of a respective groove, such that a gap across the top of the groove is reduced.

Another aspect of the present disclosure resides in a manufacturing method that includes forming one or more grooves in a component that includes a substrate with an outer surface. The substrate has at least one interior space, and each groove extends at least partially along the substrate and has a base and a top. The manufacturing method further includes applying a structural coating on the substrate and processing the surface of the structural coating so as to facet the surface of the structural coating in the vicinity of the groove.

Yet another aspect of the present disclosure resides in a component that includes a substrate with an outer surface and an inner surface, where the inner surface defines at least one interior space. The outer surface defines one or more grooves, where each groove extends at least partially along the outer surface of the substrate and has a base and a top. The component further includes a structural coating disposed on at least a portion of the substrate, where the surface of the structural coating is faceted in the vicinity of the respective groove. One or more access holes are formed through the base of a respective groove, to connect the groove in fluid communication with the respective interior space. The component further includes an additional coating disposed over at least a portion of the structural coating, where the groove(s), the structural coating and the additional coating together define one or more channels for cooling the component.

DRAWINGS

These and other features, aspects, and advantages of the present disclosure will become better understood when the following detailed description is read with reference to the accompanying drawings in which like characters represent like parts throughout the drawings, wherein.

Figure 3:
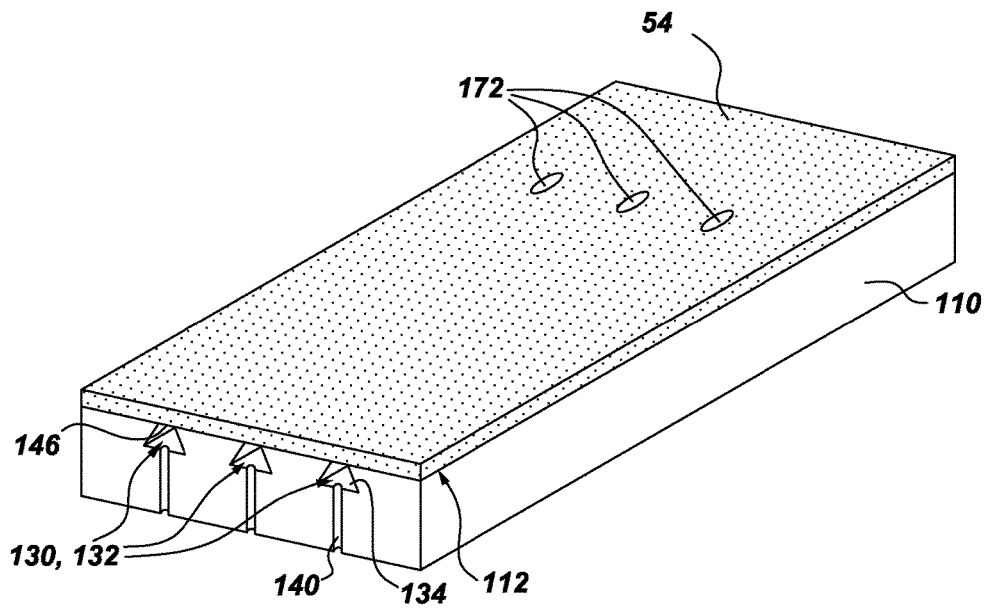
Figure 4:
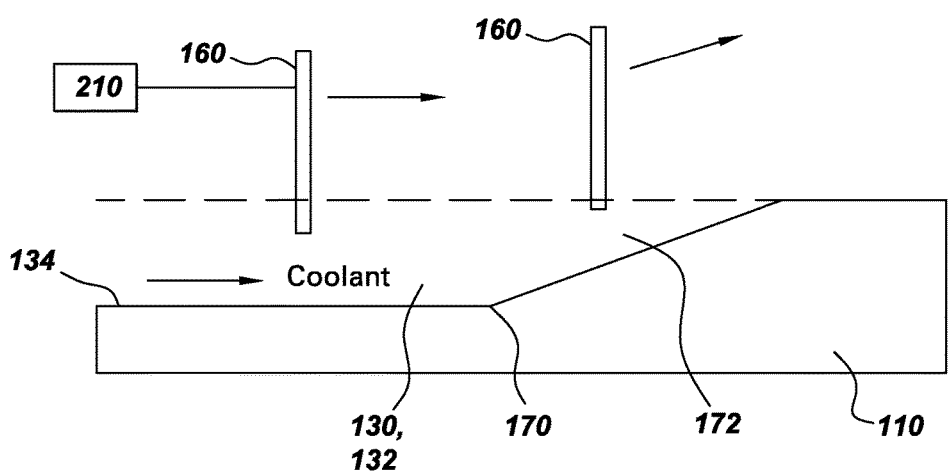
Figure 5:
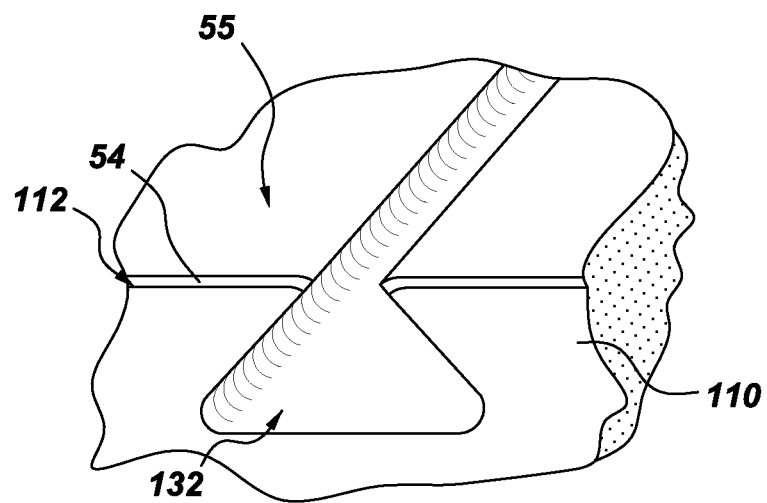
Figure 6:
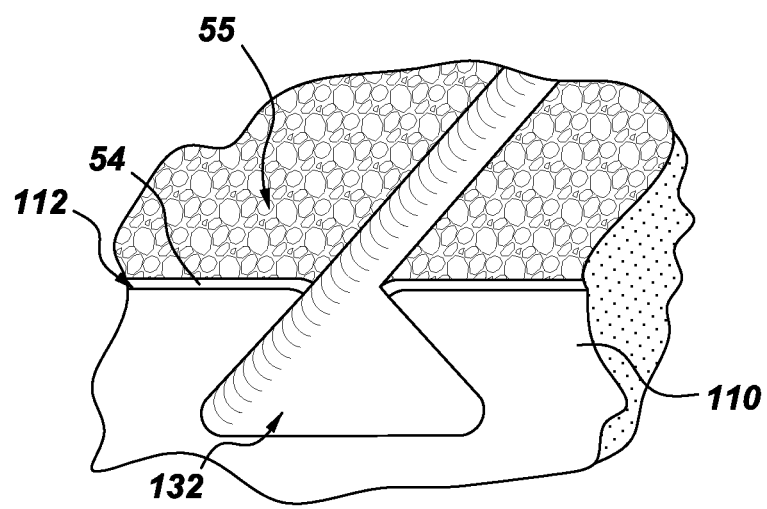
Figure 7:
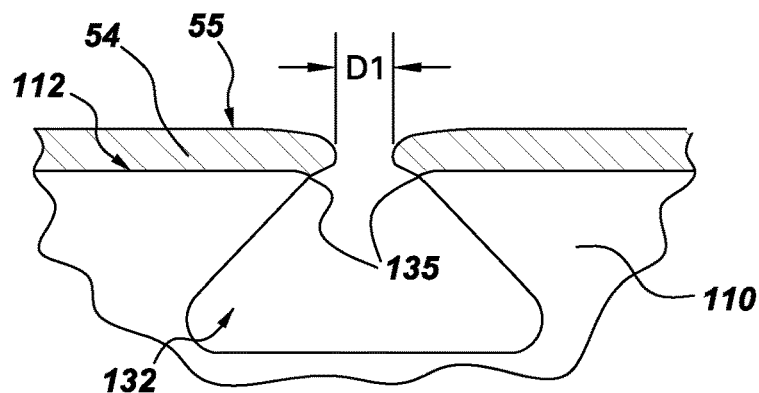
Figure 8:
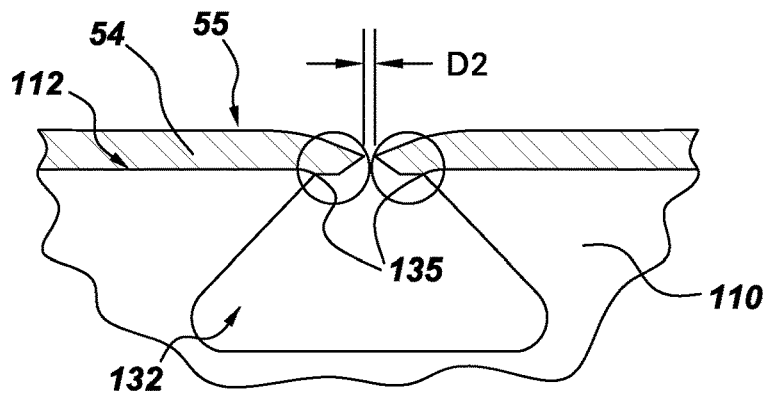
Figure 9:
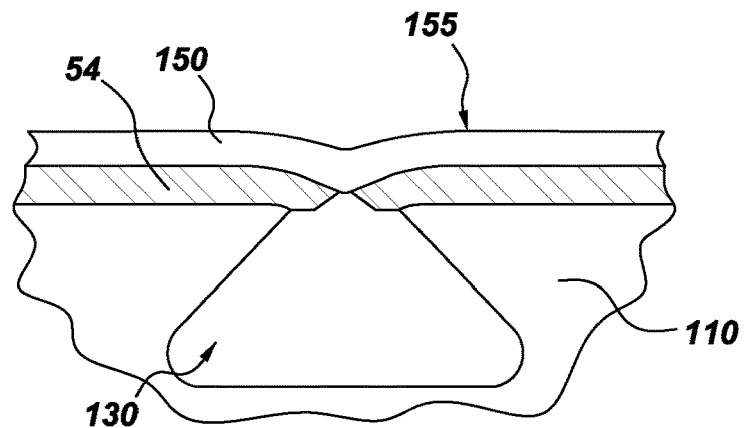
Figure 10:
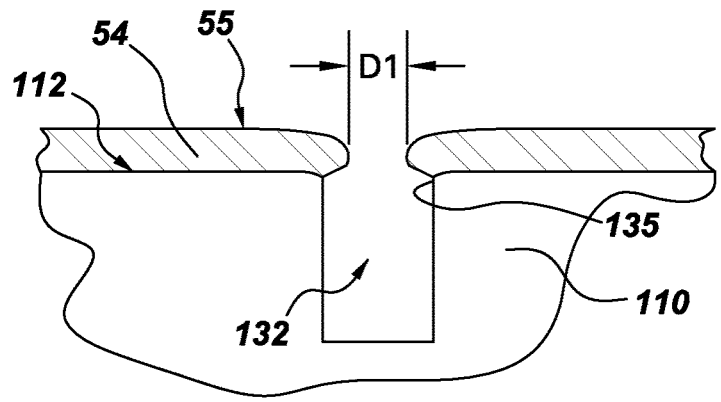
Figure 11:
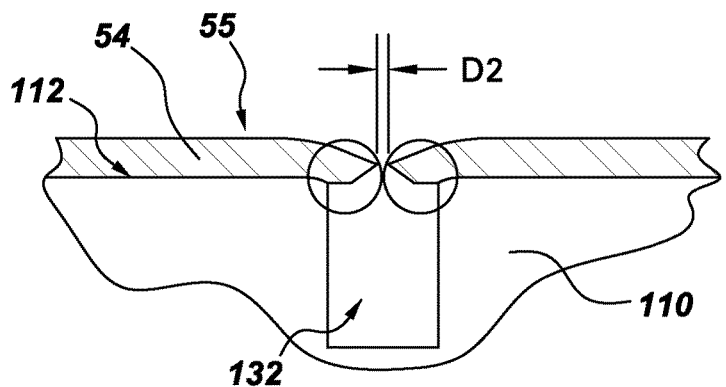
Figure 12:
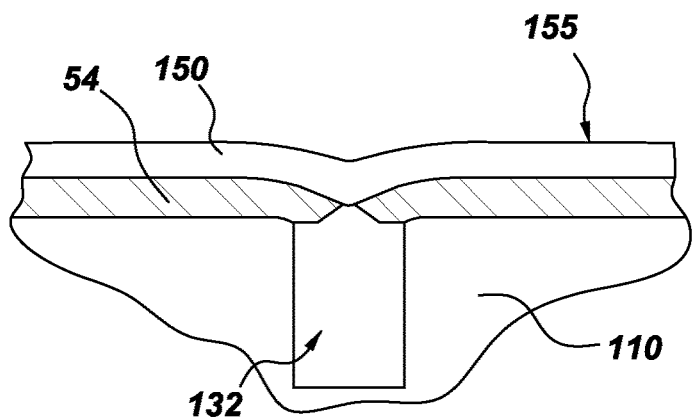
Figure 13:
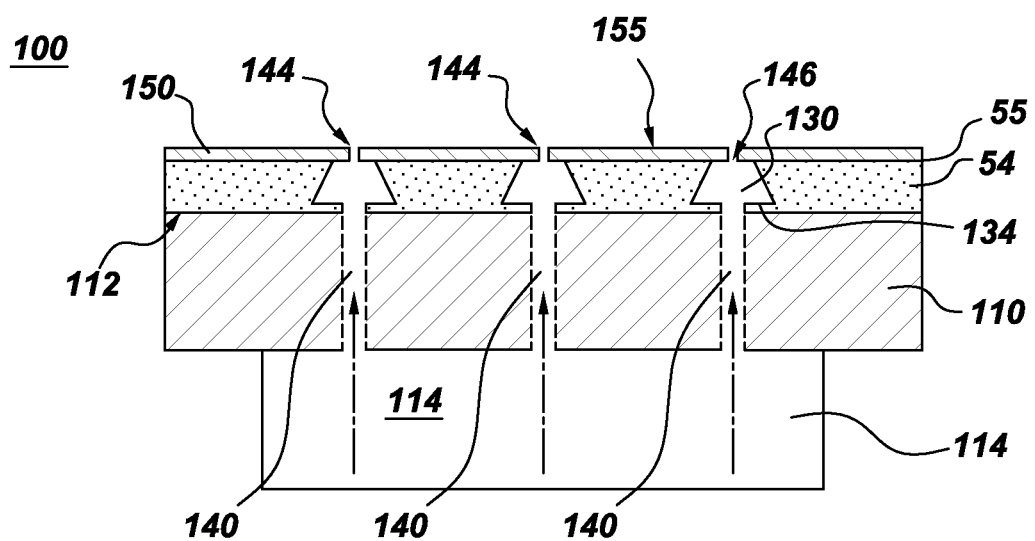

FIG. 3 schematically depicts, in perspective view, three example micro-channels that extend partially along the surface of the substrate and convey coolant to respective film cooling holes;

FIG. 4 schematically depicts an exemplary tooling path for forming a groove and a tapered, run-out region at the discharge end of the groove;

FIG. 5 schematically depicts an exemplary re-entrant shaped cooling channel prior to a post-machining surface treatment;

FIG. 6 schematically depicts the re-entrant shaped cooling channel of FIG. 5 after a post-machining surface treatment that introduces irregularities in the treated surface;

FIG. 7 is a cross-sectional view of an exemplary re-entrant shaped cooling channel partially covered by a structural coating with an opening size $D_1$ prior to a post-machining surface treatment;

FIG. 8 is a cross-sectional view of the re-entrant shaped cooling channel of FIG. 7 with the opening size of the structural coating reduced to $D_2$ after a post-machining surface treatment;

FIG. 9 is a cross-sectional view of the re-entrant shaped cooling channel of FIG. 8 with an additional coating disposed on the structural coating, where the additional coating extends over the plastically deformed opening in the structural coating;

FIG. 10 is a cross-sectional view of another exemplary cooling channel partially covered by a structural coating with an opening size $D_1$ prior to a post-machining surface treatment;

FIG. 11 is a cross-sectional view of the cooling channel of FIG. 10 with the opening size of the structural coating reduced to $D_2$ after a post-machining surface treatment;

FIG. 12 is a cross-sectional view of the cooling channel of FIG. 10 with an additional coating disposed on the structural coating, where the additional coating extends over the plastically deformed opening in the structural coating; and FIG. 13 shows re-entrant shaped channels with permeable slots formed in a structural coating.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
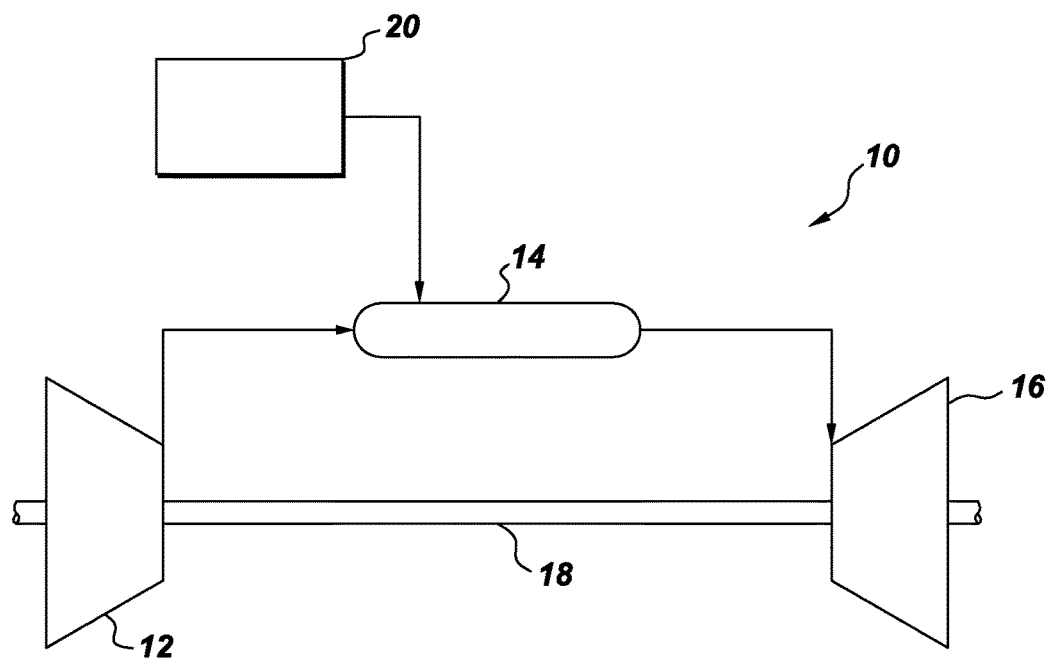
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18.

The gas turbine system 10 may include a number of hot gas path components 100. A hot gas path component is any component of the system 10 that is at least partially exposed to a flow of high temperature gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component 100 of the present disclosure is not limited to the above examples, but may be any component that is at least partially exposed to a flow of high temperature gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, as required to achieve the desired efficiency, performance and/or life of the system 10, a cooling system for the hot gas path component 100 is needed.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

Figure 2:
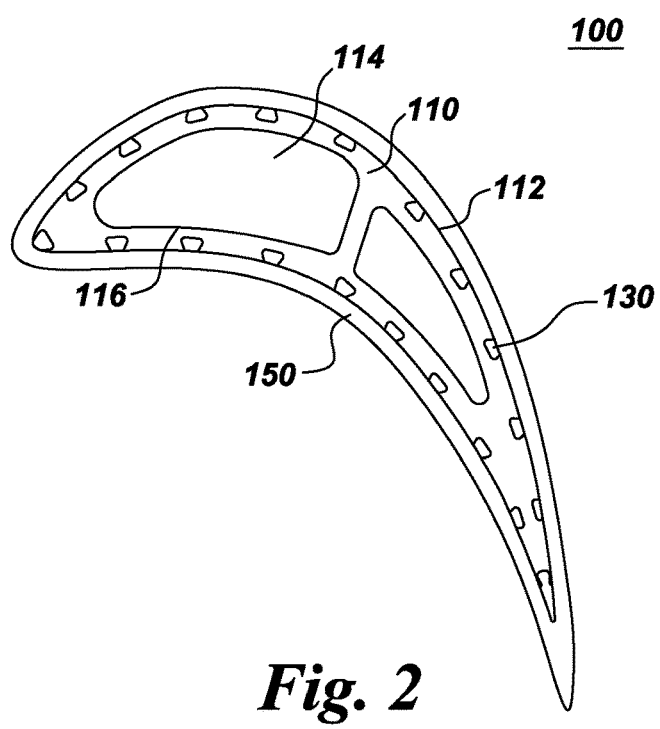
FIG. 2 is a schematic cross-section of an example airfoil configuration with re-entrant shaped cooling channels, in accordance with aspects of the present disclosure.

A manufacturing method is described with reference to FIGS. 2-12. As indicated for example in FIGS. 2 and 3, the manufacturing method includes forming one or more grooves 132 (which partially define the channels 130 in FIG. 2) in a component 100 that comprises a substrate 110 with an outer surface 112. As shown in FIG. 2, the substrate 110 has at least one interior space 114. As indicated, for example, in FIG. 3, each groove 132 extends at least partially along the substrate 110 and has a base 134 and a top 146. As discussed below, access holes 140 connect the grooves to the respective interior spaces. It should be noted that the holes 140 shown in FIG. 3 are discrete holes located in the cross-section shown and do not extend through the substrate along the length of the grooves 132.

The substrate 110 is typically cast prior to forming the groove(s) 132. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations, the substrate material comprises a ceramic matrix composite (CMC), such as a silicon carbide (SiC) matrix reinforced with SiC fibers. For other configurations the substrate material comprises a TiAl-based intermetallic compound.

The grooves 132 may have any of a number of different shapes. For the exemplary configurations shown in FIGS. 5-9, each groove 132 narrows at the respective top 146 thereof, such that each groove 132 comprises a re-entrant shaped groove 132. Re-entrant-shaped grooves are discussed in commonly assigned, U.S. patent application Ser. No. 12/943,624, R. Bunker et al., "Components with re-entrant shaped cooling channels and methods of manufacture," which is incorporated herein in its entirety. For the example configuration shown in FIGS. 10-12, the grooves 132 are rectangular in cross-section. Although the grooves are shown as having straight walls, the grooves 132 can have any wall configuration, for example, they may be straight or curved.

The grooves 132 may be formed using a variety of techniques. Example techniques for forming the groove(s) 132 include abrasive liquid jet, plunge electrochemical machining (ECM), electric discharge machining (EDM) with a spinning electrode (milling EDM), and laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular processes, the grooves are formed using an abrasive liquid jet 160 (FIG. 4). Example abrasive liquid jet drilling processes and systems are provided in commonly assigned U.S. patent application Ser. No. 12/790,675, "Articles which include chevron film cooling holes, and related processes", filed May 28, 2010, which is incorporated by reference herein in its entirety. As explained in U.S. patent application Ser. No. 12/790,675, the abrasive liquid jet process typically utilizes a high-velocity stream of abrasive particles (e.g., abrasive "grit"), suspended in a stream of high pressure water. The pressure of the liquid may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths and with control over the shape of the machined features. This allows the interior access holes 140 that supply the channel to be drilled either as a straight hole of constant cross section, a shaped hole (e.g., elliptical), or a converging or diverging hole (not shown).

In addition, and as explained in U.S. patent application Ser. No. 12/790,675, the water jet system can include a multi-axis computer numerically controlled (CNC) unit 210 (FIG. 4). The CNC systems themselves are known in the art, and described, for example, in U.S. Patent Publication 1005/0013926 (S. Rutkowski et al), which is incorporated herein by reference in its entirety. CNC systems allow movement of the cutting tool along a number of X, Y, and Z axes, as well as the tilt axes.

Referring now to FIG. 7, the manufacturing method further includes applying a structural coating 54 on at least a portion of the substrate 110. The structural coating layer 54 may be deposited using a variety of techniques. For particular processes, the structural coating may be deposited by performing ion plasma deposition (also known in the art as cathodic arc deposition). Example ion plasma deposition apparatus and method are provided in commonly assigned, U.S. Published patent application Ser. No. 10/080,138529, Weaver et al, "Method and apparatus for cathodic arc ion plasma deposition," which is incorporated by reference herein in its entirety. Briefly, ion plasma deposition comprises placing a consumable cathode having a composition to produce the desired coating material within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a structural coating deposited using ion plasma deposition are described in U.S. Pat. No. 5,626,462, Jackson et al., "Double-wall airfoil". For certain hot gas path components 100, the structural coating 54 comprises a nickel-based or cobalt-based alloy, and more particularly comprises a superalloy or a (Ni,Co)CrAlY alloy. Where the substrate material is a Ni-base superalloy containing both γ and γ' phases, structural coating may comprise similar compositions of materials, as discussed in U.S. Pat. No. 5,626,462. Additionally, for superalloys the structural coating 54 may comprise compositions based on the γ'-$Ni_3Al$ family of alloys.

More generally, the structural coating composition will be dictated by the composition of the underlying substrate. For example, for CMC substrates, such as a silicon carbide (SiC) matrix reinforced with SiC fibers, the structural coating will typically include silicon.

For other process configurations, the structural coating 54 is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, entrapment plating, and electroplating.

For the example processes depicted in FIGS. 5-12, the manufacturing method further includes processing at least a portion of a surface 55 of the structural coating 54 to plastically deform the structural coating 54 at least in a vicinity of the top 146 of a respective groove 132. The resulting processed structural coating 54 is shown, for example, in FIGS. 8 and 11, and the gap across the top 146 of the groove 132 is reduced as a result of the processing, as indicated in FIGS. 7, 8, 10 and 11, for example. In addition to the structural coating, the substrate 110 underneath may also be plastically deformed to some degree. Thus, processing the surface 55, affects a permanent deformation of the coating material or both the coating and substrate materials beneath. Beneficially, by reducing the gap across the top of the groove, the manufacturing method improves the ability of coatings to bridge the opening directly (that is, without the use of a sacrificial filler), as indicated in FIGS. 9 and 12, for example. In addition, by reducing the gap across the top of the groove, the manufacturing method facilitates the use of a less stringent machining specification for the width across the top of the groove. Beneficially, by reducing this machining specification, the manufacturing method may reduce the machining cost for the channels. Additionally, by plastically deforming the coating, localized plastic deformation of the substrate, which can lead to undesired recrystallization of the structural superalloy substrate, may be reduced or prevented.

In addition, the manufacturing method may further optionally include preheating the substrate prior to or during the deposition of the structural coating. Further, the manufacturing method may further optionally include heat treating (for example vacuum heat treating at 1100 C for two hours) the component after the structural coating has been deposited and prior to processing the surface of the structural coating. Thus, the step of processing the surface of the structural coating can be pre- or post-heat treatment. These heat treating options may improve the adhesion of the coating to the substrate and/or increase the ductility of the coating, both facilitating the processing of the coated substrate so as to plastically deform the coating and reduce the gap across the top of the groove. In addition, the manufacturing method may further optionally include performing one or more grit blast operations. For example, the substrate surface 112 may optionally be grit blast prior to applying the structural coating 54. In addition, the processed surface may optionally be subjected to a grit blast, so as to improve the adherence of a subsequently deposited coating. Grit blast operations would typically be performed after heat treatment, rather than immediately prior to heat treatment.

Commonly assigned U.S. patent application Ser. No. 13/242,179, applies similar processing to the substrate. However, by processing the structural coating(s), the above described method is advantageous, in that the structural coating may be more ductile than the substrate and therefore more amenable to plastic deformation. In addition, defects induced in the structural coating by the deformation process will affect a lower mechanical debit of the coated component and may be healed more readily than those in the substrate during subsequent heat treatment. The system having a structural coating can therefore be deformed to a greater degree using the above-described method than can the uncoated substrate using the method of U.S. patent application Ser. No. 13/242,179. In addition, if the deformation is limited to the structural coating only, then this may also avoid recrystallization of the substrate (relative to the method of U.S. patent application Ser. No. 13/242,179), leading to improved mechanical properties under cyclic loading.

Although not expressly shown, for particular applications, the processing of the surface 55 of structural coating 54 reduces the gap in the structural coating 54 in the vicinity of the top 146 of the groove 132. As used here, "reduces the gap" means that the gap width after processing is less than that before processing. For particular configurations, the processing may geometrically close the opening, where "geometrically closed" means the structural coating 54 is brought in close proximity with coating from the opposing side of the groove opening substantially closing the gap. Thus, as used here, being geometrically closed is not equivalent to being metallurgically bonded. However, for certain process configurations, a metallurgical bond may in fact form. Beneficially, reducing the size of the gap, further improves the ability of coatings to bridge the opening directly.

Referring now to FIGS. 5-12, the surface 55 of the structural coating 54 may be processed using one or more of a variety of techniques, including without limitation, shot peening the surface 55, water jet peening the surface 55, flapper peening the surface 55, gravity peening the surface 55, ultrasonic peening the surface 55, burnishing the surface 55, low-plasticity burnishing the surface 55, and laser shock peening the surface 55, to plastically deform the structural coating 54 (and possibly also a portion of the substrate 110) at least in the vicinity of the groove 132, such that the gap across the top 146 of the groove 132 is reduced.

For particular processes, the surface 55 of the structural coating 54 is processed by shot peening. As indicated in FIG. 6, for example, shot peening typically introduces a number of surface irregularities in the surface 55 of the structural coating 54. Beneficially, the surface irregularities may aid in the bridging of coatings deposited over the surface, and especially coatings deposited using processes, such as ion plasma deposition, electron beam physical vapor deposition, and sputtering.

For other processes, the surface 55 of the structural coating 54 is processed by burnishing. A variety of burnishing techniques may be employed, depending on the material being surface treated and on the desired deformation. Non-limiting examples of burnishing techniques include plastically massaging the surface of the structural coating, for example using rollers, pins, or balls, and low plasticity burnishing.

The gap across the top of the groove will vary based on the specific application. However, for certain configurations, the gap across the top 146 of the groove 132 is in a range of about 8-31 mil (0.2-0.8 mm) prior to processing the surface 55 of the structural coating 54, and the gap across the top 146 of the groove 132 is in a range of about 0-15 mil (0-0.4 mm) after processing the surface 55 of the structural coating 54.

For particular configurations, the step of processing the surface 55 of the structural coating 54 also facets the structural coating 54, in the vicinity of the groove 132. As used herein, "faceting" should be understood to tilt the surface 55 in the vicinity of the groove 132 toward the groove, as indicated, for example, in the circled regions in FIG. 8.

As indicated, for example, in FIGS. 9 and 12, the manufacturing method may further include disposing an additional coating 150 over at least a portion of the surface 55 of the structural coating 54. It should be noted that this additional coating 150 may comprise one or more different coating layers. For example, the coating 150 may include an additional structural coating and/or optional additional coating layer(s), such as bond coatings, thermal barrier coatings (TBCs) and oxidation-resistant coatings. For particular configurations, the additional coating 150 comprises an outer structural coating layer (which is also indicated by reference numeral 150). As indicated, for example, in FIGS. 9 and 12, the groove(s) 132, the structural coating 54 and the additional coating 150 define one or more channels 130 for cooling the component 100.

For particular configurations, the structural coating 54 and additional coating 150 have a combined thickness in the range of 0.1-2.0 millimeters, and more particularly, in the range of 0.2 to 1 millimeter, and still more particularly 0.2 to 0.5 millimeters for industrial components. For aviation components, this range is typically 0.1 to 0.25 millimeters. However, other thicknesses may be utilized depending on the requirements for a particular component 100.

The coating layer(s) may be deposited using a variety of techniques. Example deposition techniques for forming structural coatings are provided above. In addition to structural coatings, bond coatings, TBCs and oxidation-resistant coatings may also be deposited using the above-noted techniques.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion thermal spray process or a plasma spray process. Depending on the materials used, the use of different deposition techniques for the coating layers may provide benefits in properties, such as, but not restricted to: strain tolerance, strength, adhesion, and/or ductility.

In addition to processing the surface 55 of the structural coating 54, for certain process configurations, the manufacturing method may further optionally include processing at least a portion of a surface 155 (FIGS. 9, 12 and 13) of the additional coating 150 to plastically deform the additional coating 150 at least in the vicinity of the top 146 of a respective groove 132. For example, the additional coating may comprise another layer of structural coating or of the bond coating. Beneficially, the additional processing may reduce the width of the gap cross the top 146 of the groove, such that any subsequently deposited coating layer would more readily be able to bridge (with or without porous gaps 144, as discussed below with reference to FIG. 13) the opening directly (that is, without the use of sacrificial fillers).

In addition, for certain process configurations, the manufacturing method may optionally include processing at least a portion of the outer surface 112 of the substrate 110 to plastically deform the respective portion of the substrate 110. (See, for example, FIG. 8 of U.S. patent application Ser. No. 13/242,179.) This additional optional processing step may be performed prior to the step of applying the structural coating 54 on the substrate 110. Beneficially, the additional processing step may reduce the width of the opening 146, as explained in U.S. patent application Ser. No. 13/242,179.

Another manufacturing method embodiment of the disclosure is described with reference to FIGS. 2, 3 and 5-12. As indicated in FIG. 2, for example, the manufacturing method includes forming one or more grooves 132 in a component 100 that comprises a substrate 110 with an outer surface 112. As shown in FIG. 2, the substrate 110 has at least one interior space 114. As indicated, for example, in FIG. 3, each groove 132 extends at least partially along the substrate 110 and has a base 134 and a top 146.

As noted above, the substrate 110 is typically cast prior to forming the groove(s) 132. Example techniques for forming grooves 132 are described above and include, without limitation, using one or more of an abrasive liquid jet, plunge electrochemical machining (ECM), electric discharge machining (EDM) with a spinning electrode (milling EDM), and laser machining. Grooves 132 are also described above. As discussed above, the grooves 132 may have any of a number of different shapes. For the configurations shown in FIGS. 5-9, for example, each groove 132 narrows at the respective top 146 thereof, such that each groove 132 is a re-entrant shaped groove 132.

Referring now to FIG. 7, the manufacturing method further includes applying a structural coating 54 on the substrate 110. Example deposition techniques and example suitable materials for the structural coating 54 are described above.

For the example processes depicted in FIGS. 5-12, the manufacturing method further includes processing the surface 55 of the structural coating 54 to facet the surface 55 of the structural coating 54 in the vicinity of the groove 132. As noted above, "faceting" should be understood to tilt the surface 55 in the vicinity of the groove 132 toward the groove, as indicated, for example, in the circled regions in FIG. 8. Beneficially, tilting the surface 55 toward the groove in the vicinity of the groove improves the bridging of a subsequently deposited coating 150 over the groove opening (without the use of a sacrificial filler), such that the mechanical specifications for the groove opening may be relaxed, facilitating the use of a larger water jet nozzle to form the grooves. This reduces the time needed to form the grooves, as well as the associated machining cost.

As described above, a number of techniques may be used to process the surface 55 of the structural coating 54, including performing one or more of shot peening the surface 55, water jet peening the surface 55, flapper peening the surface 55, gravity peening the surface 55, ultrasonic peening the surface 55, burnishing the surface 55, low plasticity burnishing the surface 55, and laser shock peening the surface 55, to facet the surface 55 of the structural coating 54 adjacent at least one edge 135 of the groove, such that the gap across the top 146 of the groove 132 is reduced.

For particular process configurations, the surface 55 of the structural coating 54 is processed by shot peening the surface 55. As indicated, for example, in FIG. 6, the shot peening introduces a number of surface irregularities in the surface 55 of the structural coating 54. As noted above, the surface irregularities may aid in the bridging of coatings (completely or with porous gaps 144, which are discussed below with reference to FIG. 13) deposited over the surface without the use of a sacrificial filler, and especially coatings deposited using ion plasma deposition, electron beam physical vapor deposition, and sputtering.

Referring now to FIGS. 9 and 12, the manufacturing method may further optionally include disposing an additional coating 150 over at least a portion of the surface 55 of the structural coating 54. As noted above, this additional coating 150 can be one or more different coatings. As indicated, for example, in FIG. 9, the groove(s) 132, the structural coating 54 and the additional coating 150 define one or more channels 130 for cooling the component 100. Additional coating 150 comprises a suitable material and is bonded to the component. Example materials and deposition techniques for additional coating are described above.

In addition to processing the surface 55 of the structural coating 54, for certain process configurations, the manufacturing method may further optionally include processing at least a portion of a surface 155 (FIGS. 9, 12, and 13) of the additional coating 150 to facet the surface 155 in the vicinity of the top 146 of a respective groove 132. For example, the additional coating may comprise an outer layer of structural coating or of the bond coating or TBC. As noted above, the additional processing may beneficially reduce the gap across the top 146 of the groove, such that any subsequently deposited coating layer would more readily be able to bridge (completely or with porous gaps 144) the opening directly (that is, without the use of a sacrificial filler).

In addition, for certain process configurations, the manufacturing method may optionally include processing at least a portion of the outer surface 112 of the substrate 110 to plastically deform the respective portion of the substrate 110. (See, for example, FIG. 8 of U.S. patent application Ser. No. 13/242,179.) This optional additional processing step may be performed prior to the step of applying the structural coating 54 on the substrate 110. As noted above, the additional processing step may reduce the width of the opening 146, as explained in U.S. patent application Ser. No. 13/242, 179.

A component 100 embodiment of the disclosure is described with reference to FIGS. 2, 3, 6-9, 12, and 13. As shown, for example, in FIG. 2, the component 100 includes a substrate 110 with an outer surface 112 and an inner surface 116. As indicated in FIG. 2, for example, the inner surface 116 defines at least one interior space 114. As shown in FIG. 3, the outer surface 112 defines one or more grooves 132. Each groove 132 extends at least partially along the outer surface 112 of the substrate 110 and has a base 134 and a top (opening) 146. For the configuration shown in FIG. 3, each groove 132 narrows at the respective top 146 thereof, such that each groove 132 is a re-entrant shaped groove 132. However, the grooves may have other shapes as well. Grooves 132 are described in detail above.

As indicated, for example, in FIG. 7, the component 100 further includes a structural coating 54 disposed on at least a portion of the substrate 110. As indicated in FIG. 8, for example, the surface 55 of the structural coating 54 is faceted in the vicinity of the respective groove 132.

As shown, for example, in FIGS. 3 and 13, one or more access holes 140 are formed through the base 134 of a respective groove 132, to connect the groove 132 in fluid communication with the respective interior space 114 (FIG. 13). It should be noted that the access holes 140 are discrete holes and are thus not coextensive with the channels 130, as indicated in FIG. 3, for example.

Referring now to FIGS. 9, 12 and 13, the component 100 further includes an additional coating 150 disposed over at least a portion of the structural coating 54. As noted above, the additional coating may comprise one or more coating layers having a single or distinct compositions. As indicated in FIG. 9, for example, the groove(s) 132, the structural coating 54 and the additional coating 150 together define one or more channels 130 for cooling the component 100.

For the particular configuration depicted in FIG. 6, a number of surface irregularities are formed in the surface 55 of the structural coating 54 in the vicinity of the respective groove 132.

As discussed above, for particular configurations, the additional coating 150 may comprise an outer structural coating layer, which is also indicated by reference numeral 150. Although not expressly shown, for particular configurations, the surface 155 of the additional coating 150 may also be faceted in the vicinity of the respective groove 132. Also, and although not expressly shown, for particular configurations, the substrate 110 may itself be plastically deformed in the vicinity of the respective groove 132.

Beneficially, the above described manufacturing methods can affect complete or partial closure of the gap in the channel surface by processing the surface of the structural coating, so as to plastically deform it. This, in turn, facilitates bridging of the channel (including the possibility of the porous gaps 144 discussed above with reference to FIG. 13) by the next coating. The resulting finished component may thus show no signs of: the microchannels, visual cracks, or gaps. This provides a more uniform structural coating in terms of micro-structure and strength when applied over a processed structural coating.

Although only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A component comprising:
   a substrate comprising an outer surface and an inner surface, wherein the inner surface defines at least one interior space, wherein the outer surface defines a plurality of grooves, wherein each groove extends at least partially along the outer surface of the substrate and has a base and a top, each base is spaced from the outer surface and each top is in the outer surface and defines a groove opening in the outer surface of the substrate, and one or more access holes are formed though the base of a respective groove, to connect the groove in fluid communication with the respective interior space;
   a first coating, having an outer surface and an inner surface, the inner surface disposed on and in contact with at least a portion of the outer surface of the substrate, wherein the coating comprises a plurality of coating openings, each coating opening above a respective groove opening of the substrate, the outer surface of the first coating is faceted toward each groove base in a vicinity of each groove adjacent at least one edge of the groove opening; and
   an optional second coating disposed over at least a portion of the outer surface of the first coating, wherein spaces formed between the inner surface of the first coating and the groove bases and the optional second coating together define a plurality of channels for cooling the component.

2. The component of claim 1, wherein a plurality of surface irregularities are formed in the outer surface of the first coating in the vicinity of each groove.

3. The component of claim 1, wherein the second coating comprises one or more of a bond coating and a thermal barrier coating.

4. The component of claim 1, wherein an outer surface of the second coating is faceted toward each groove base in the vicinity of each groove.

5. The component of claim 1, wherein each groove narrows at the respective top thereof, such that each groove comprises a re-entrant shaped groove, and each channel comprises a re-entrant shaped channel.

6. The component of claim 1, wherein the second coating comprises a plurality of gaps at positions corresponding to the groove openings.

\* \* \* \* \*